United States Patent [19]
Silverberg

[11] 4,198,155
[45] Apr. 15, 1980

[54] PHOTOCONDUCTIVE BELT ASSEMBLY

[75] Inventor: Morton Silverberg, Rochester, N.Y.
[73] Assignee: Xerox Corporation, Stamford, Conn.

[21] Appl. No.: 956,123
[22] Filed: Oct. 30, 1978
[51] Int. Cl.[2] G03G 15/00; F16G 1/00
[52] U.S. Cl. 355/16; 74/231 J
[58] Field of Search 355/16; 74/231 R, 231 P, 74/232, 240, 231 J

[56] References Cited

U.S. PATENT DOCUMENTS

| | | | |
|---|---|---|---|
| 766,930 | 8/1904 | Clemons | 74/231 J X |
| 900,481 | 10/1908 | Campbell | 74/240 |
| 2,052,285 | 8/1936 | De Rabot | 74/232 UX |
| 2,060,906 | 11/1936 | Snyder | 74/231 J UX |
| 2,627,185 | 2/1953 | Bramhall et al. | 74/232 |
| 3,520,604 | 7/1970 | Shelffo | 355/16 |
| 3,533,692 | 10/1970 | Blanchette et al. | 355/16 |
| 3,846,021 | 11/1974 | Vola | 355/16 |
| 3,930,852 | 1/1976 | Tanaka et al. | 355/16 X |
| 3,958,879 | 5/1976 | Hamaguchi et al. | 355/16 |

FOREIGN PATENT DOCUMENTS

| | | | |
|---|---|---|---|
| 901243 | 7/1962 | United Kingdom | 74/232 |

*Primary Examiner*—Donald A. Griffin
*Attorney, Agent, or Firm*—J. J. Ralabate; C. A. Green; H. Fleischer

[57] ABSTRACT

A belt assembly in which a sub-belt has a photoconductive belt secured releasably thereto. The sub-belt and photoconductive belt move in unison with one another about a defined path.

8 Claims, 4 Drawing Figures

PHOTOCONDUCTIVE BELT ASSEMBLY

The foregoing abstract is neither intended to define the invention disclosed in the specification, nor is it intended to be limiting as to the scope of the invention in any way.

BACKGROUND OF THE INVENTION

This invention relates generally to a photoconductive belt assembly employed in an electrophotographic printing machine, and more particularly concerns a belt assembly comprising a sub-belt having a photoconductive belt secured releasably thereto.

In an electrophotographic printing machine, a photoconductive belt is charged to a substantially uniform potential so as to sensitize the surface thereon. Thereafter, the charged portion of the photoconductive belt is exposed to a light image of an original document being reproduced. Exposure of the charged photoconductive belt selectively discharges the charge thereon in the irradiated areas. This records an electrostatic latent image on the photoconductive belt corresponding to the informational areas contained within the original document being reproduced. After the electrostatic latent image is recorded on the photoconductive belt, the latent image is developed by bringing a developer mix into contact therewith. The developer mix comprises toner particles adhereing triboelectrically to carrier granules. These toner particles are attracted from the carrier granules to the latent image forming a toner powder image thereon. The toner powder image is then transferred to a copy sheet. Finally, the copy sheet is heated to permanently affix the toner particles thereto in image configuration. This general approach was originally disclosed by Carlson in U.S. Pat. No. 2,297,691, and has been further amplified and described by many related patents in the art.

Generally, an electrophotographic printing machine utilizes either a photoconductive drum or belt. Various materials have been proposed for photoconductive belts or drums employed in electrophotographic printing machines. One well known material is made from a selenium alloy which is capable of producing a substantially large number of copies. Another material may be of an organic type. However, both of these materials, when used as belts, frequently pose difficulties in belt tracking. Typically, the photoconductive belt is rather thin and sensitive to edge forces. Thus, an edge guide tracking system may introduce side buckling or lateral distortion of the photoconductive belt which will significantly impair the usage thereof. Moreover, the photoconductive belt is frequently seamed. When a seamed photo-conductive belt is employed, the position of the seam must be known so as to synchronize the placement of the electrostatic latent image and registration of the copy sheet therewith. Heretofore, this type of synchronization was achieved by having holes in the belt edge which are sensed. Alternatively, the belt holes may mesh with a sprocket wheel. The sprocket wheel would then drive a synchroneous registration member. Another technique is to mark the photoconductive belt with opaque, reflective, or magnetic indicia. This indicia would be detected and employed to control the exposure and copy sheet registration. However, all of the former approaches require additional processing of the photoconductive belt. Processing of this type increases costs and risks to the belt reliability. In addition, edge guiding poses a serious risk to the belt structural integrity.

Accordingly, it is a primary object of the present invention to improve the photoconductive belt assembly employed in an elecetrophotographic printing machine.

Prior Art Statement

Various types of devices have been developed for supporting and replenishing photoconductive belts. The following co-pending United States patent application appears to be relevant:

U.S. Pat. application Ser. No. 946,006 filed Sept. 27, 1978.

This application describes a photoconductor belt assembly in which a sub-belt has a photoconductive belt secured releasably thereto. The photoconductive belt is advanced from a storage roll into contact with the sub-belt. As the photoconductive belt is secured to the sub-belt, the storage roll is arranged to pivot and translate. This insures that the photoconductive belt is secured to the sub-belt in a substantially wrinkle-free condition.

It is believed that the scope of the present invention, as defined by the appended claims, is patentably distinguishable over the above-cited co-pending application.

SUMMARY OF THE INVENTION

Briefly stated, and in accordance with the present invention there is provided a belt assembly having a photoconductive belt secured releasably to a sub-belt.

Pursuant to the features of the invention, the photoconductive belt is secured releasably to one surface of the sub-belt. Means are provided for supporting movably the sub-belt. The supporting means defines a path about which the sub-belt moves in unison with the photoconductive belt.

BRIEF DESCRIPTION OF THE DRAWINGS

Other objects and advantages of the present invention will become apparent upon reading the following detailed description and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
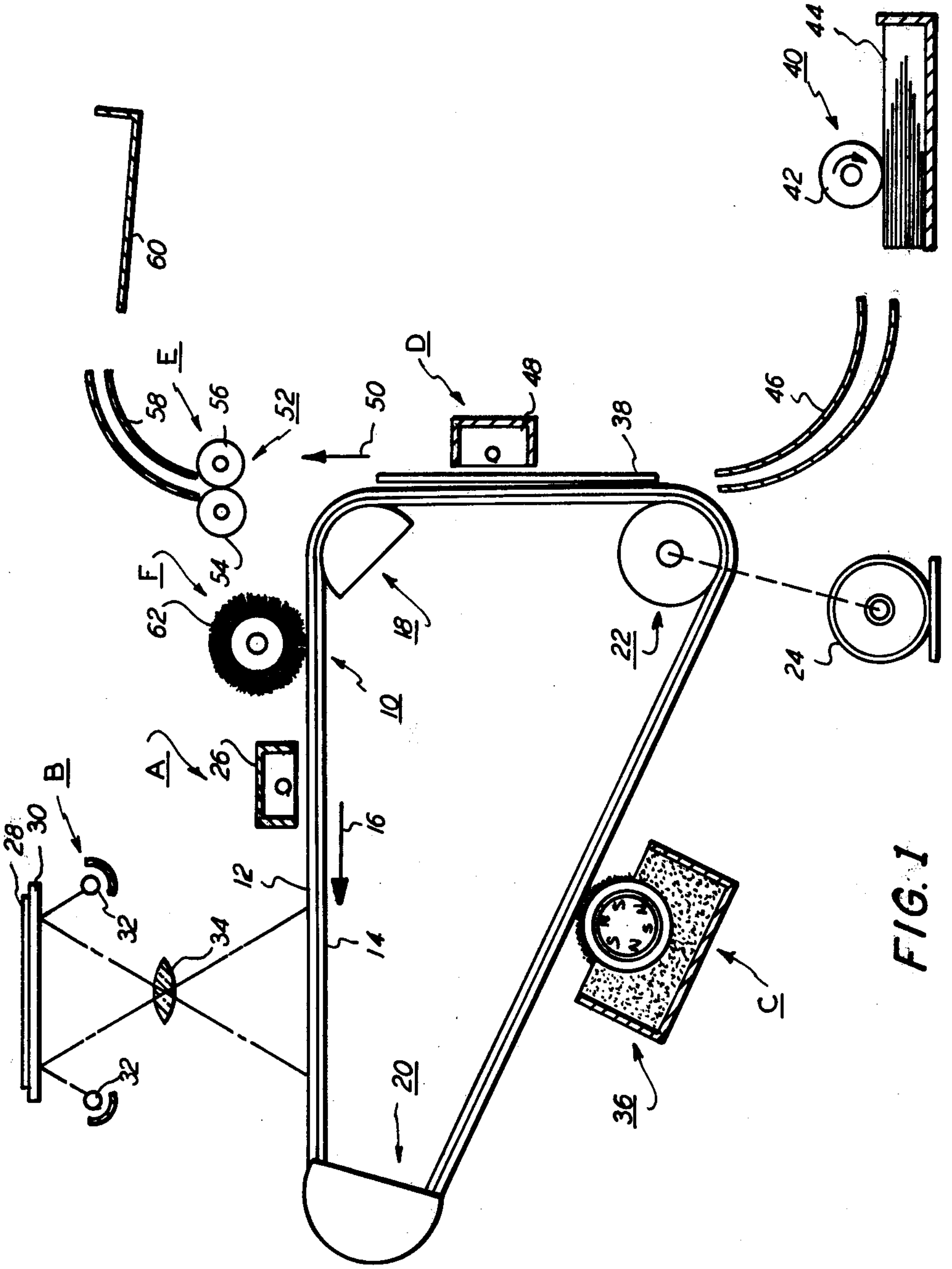
FIG. 1 is a schematic elevational view depicting an electrophotographic printing machine incorporating the features of the present invention therein.

For a general understanding of the illustrative electrophotographic printing machine incorporating the features of the present invention therein, reference is had to the drawings. In the drawings, like reference numerals have been used throughout to designate identical elements. FIG. 1 schematically depicts the various components of an electrophotographic printing machine incorporating the photoconductive belt assembly of the present invention therein. Although the belt assembly is particularly well adapted for use in an electrophotographic printing machine, it will become evident from the following discussion that it is equally well suited for use in a wide variety of electrostatographic printing machines, and is not necessarily limited in its application to the particular embodiment shown herein.

Inasmuch as the art of electrophotographic printing is well known, the various processing stations employed in the FIG. 1 printing machine will be shown hereinafter schematically, and their operation described briefly with reference thereto.

Turning now to FIG. 1, the electrophotographic printing machine employs a photoconductive belt assembly 10 comprising a photoconductive belt 12 secured releasably to a transparent sub-belt 14. Preferably, photoconductive belt 12 is an organic photoconductor with sub-belt 14 being made from a transparent material such as Mylar. Photoconductive belt 12 is secured releasably to sub-belt 14 and moves in unison therewith in the direction of arrow 16. In this way, photoconductive belt 12 moves sequentially through the various processing stations disposed about the path of the periphery thereof. Sub-belt 14 is entrained about sterring post 18, tension post 20 and drive roller 22. Tension post 20 is mounted resiliently on a spring and arranged to pivot about an axis substantially normal to the longitudinal axis thereof. The pivot axis is substantially normal to the plane defined by the approaching belt assembly 10. Belt end guides or flanges are positioned on both sides thereof and define a passageway through which belt assembly 10 passes. Steering post 18 is mounted pivotably and has a moment applied thereon by belt assembly 10 tilting thereof in a direction to reduce the approach angle of belt assembly 10 to drive roller 22, i.e., the belt velocity acting relative to the normal to the drive roller axis of rotation. This restores belt assembly 10 to the pre-determined path of movement minimizing lateral deflection. Post 18 is adapted to pivot about an axis substantially normal to the longitudinal axis thereof. The pivot axis is substantially perpendicular to the plane defined by the approaching belt assembly 10. Drive roller 22 is in engagement with sub-belt 14 and advances belt assembly 10 in the direction of arrow 16. Roller 22 is rotated by motor 24 coupled thereto by suitable means, such as a belt. A blower system is connected to steering post 18 and tension post 20. Both steering post 18 and tension post 20 have small holes in the circumferential surface thereof coupled to an interior chamber. The blower system furnishes pressurized fluid, i.e. a compressible gas such as air, into the interior chamber. The fluid exits from the interior chamber through the apertures to form a fluid film between sub-belt 14 and the respective posts, i.e. steering post 18 and tension post 20. In this manner, the fluid film at least partially supports belt assembly 10 as it passes over the respective post diminishing friction therebetween. A common blower system is employed for both steering post 18 and tension post 20. Sub-belt 14 includes a plurality of equally spaced holes in either side marginal region thereof. Photoconductive belt 12 is narrower than sub-belt 14. In this way, the side marginal regions of sub-belt 14 extend beyond the sides of photoconductive belt 12. Thus, the side marginal edges of photoconductive belt 12 remain spaced from the flanges on tension post 20 with the side marginal edges of sub-belt 14 engaging the flanges on tension post 20. This maintains the composite photoconductive belt assembly in the preferred path of travel. Inasmuch as sub-belt 14 is substantially thicker than photoconductive belt 20, little or no progressive damage occurs to sub-belt 14 due to the forces applied thereon by the flanges of tension post 20.

Photoconductive belt 12 may be seamed. This requires knowing the location of the seam so that an electrostatic latent image is not recorded in the vicinity thereof. This may be achieved by positioning the seam of photoconductive belt 12 in a precise location relative to sub-belt 14. For example, a pair of co-linear apertures in sub-belt 14 may determine the location of the seam in photoconductive belt 12. Thus, a light source positioned on one side of the apertures and a photosensor position on the other side thereof would provide an output signal as each hole in sub-belt 12 passes thereover. However, a second photosensor and light source would only provide an output signal when both co-linear holes in sub-belt 14 pass thereover. In this manner, the location of the seam in photoconductive belt 12 would be defined. Thus, when a pair of signals were received from both photosensors, the machine logic would inhibit operation thereof preventing an electrostatic latent image from being recorded on the seam. It is thus apparent that the holes in sub-belt 12 act as timing holes and the signals from the respective photosensors key the operation of the various processing stations disposed about the periphery of belt assembly 10. Alternativley, the apertures in sub-belt 12 could mesh with a sprocket gear which would drive a synchronous registration member so as to provide an indication of the positioning of the sub-belt.

With continued reference to FIG. 1, the operation of the electrophotographic printing machine will now be briefly described. Initially, a portion of photoconductive belt 12 passes through charging station A. At charging station A, a corona generating device, indicated generally by the reference numeral 26, charges photoconductive belt 12 to a relatively high, substantially uniform potential. A suitable corona generating device is described in U.S. Pat. No. 2,836,725, issued to Vyverberg in 1958.

Next, the charged portion of photoconductive belt 12 advances through exposure station B. At exposure station B, an original document 28 is positioned face-down upon transparent platen 30. Lamp 32 flash light rays onto the original document. The light rays reflected from the original document are transmitted through lens 34 onto the charged portion of photoconductive belt 12. The charged photoconductive belt is selectively discharged by the light image of the original document. This records an electrostatic latent image on photoconductive belt 12 which corresponds to the informational areas contained within original document 28.

Thereafter, photoconductive belt 12 advances the electrostatic latent image recorded thereon to development station C. At development station C, a magnetic brush developer roller 36 moves the developer mix into contact with the electrostatic latent image recorded on photoconductive belt 12. The developer mix comprises carrier granules having toner particles adhering triboelectrically thereto. The magnetic brush developer roller forms a chain-like array of developer mix extending in an outwardly direction therefrom. The developer mix contacts the electrostatic latent image recorded on photoconductive belt 12. The latent image attracts the toner particles from the carrier granules forming a toner powder image on photoconductive belt 12.

The toner powder image deposited on photoconductive belt 12 is then advanced to transfer station D. At transfer station D, a sheet of support material 38 is positioned in contact with the toner powder image formed on belt 12. The sheet of support material is advanced to the transfer station by a sheet feeding apparatus 40. Preferably, sheet feeding apparatus 40 includes a feed roller 42 contacting the uppermost sheet of the stack 44 of sheets of support material. Feed roller 42 rotates so as to advance the uppermost sheet from stack 44 into chute 46. Chute 46 directs the advancing sheet of support material into contact with photoconductive belt 12 in a timed sequence so that the powder image developed thereon contacts the advancing sheet of support material at transfer station D.

Transfer station D includes a corona generating device 48 which applies a spray of ions to the backside of sheet 38. This attracts the toner powder image from photoconductive belt to sheet 38. After transfer, sheet 38 continues to move in the direction of arrow 50 and is separated from belt 12 by a detack corona generating device (not shown) which neutralizes the charge thereon causing sheet 38 to adhere to belt 12. A conveyor system (not shown) advances the sheet from belt 12 to fusing station E.

Fusing station E includes a fuser assembly, indicated generally by the reference numeral 52, which permanently affixes the transferred toner powder image to sheet 34. Preferably, fuser assembly 52 includes a heated fuser roller 54 and a back-up roller 56. Sheet 38 passes between fuser roller 54 and back-up roller 56 with the toner powder image contacting fuser roller 54. In this manner, the toner powder image is permanently affixed to sheet 38. After fusing, chute 58 guides the advancing sheet 38 to catch tray 60 for subsequent removal from the printing machine by the operator.

Invariably after the sheet of support material is separated from photoconductive belt 12, some residual particles remain adhering to the surface of belt 12. These residual particles are removed from photoconductive belt 12 at cleaning station F. Cleaning station F includes a rotatably mounted fiberous brush 62 in contact with photoconductive belt 12. The particles are cleaned from photoconductive belt 12 by the rotation of brush 62 in contact therewith. Subsequent to cleaning, a discharge lamp (not shown) floods photoconductive belt 12 with light to dissipate any residual electrostatic charge remaining thereon prior to the charging thereof for the next successive imaging cycle.

It is believed that the foregoing description is sufficient for purposes of the present application to illustrate the generaly operation of an electrophotographic printing machine incorporating therein the belt assembly of the present invention.

Figure 2:
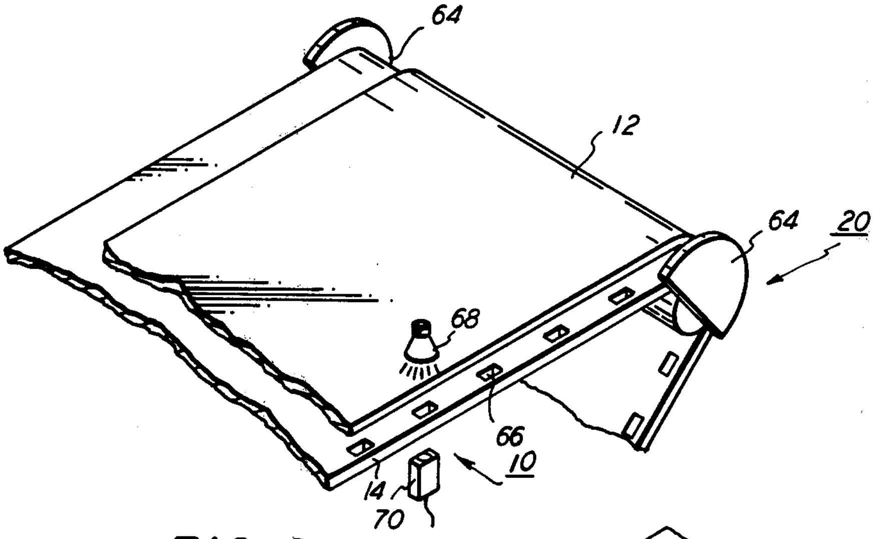
FIG. 2 is a fragmentary perspective view depicting one of the belt supports used in the FIG. 1 printing machine.

Referring now to the specific subject matter of the present invention, FIG. 2 depicts photoconductive belt 12 positioned on sub-belt 14 as belt assembly 10 passes over tension post 20. As shown therein, tension post 20 includes a pair of opposed spaced side flanges 64 which define a path through which photoconductive belt assembly 10 passes. When belt assembly 10 deviates laterally from the desired path, one side marginal edge of sub-belt 14 engages one of the flanges 64. The flange exerts a force thereon which restores belt assembly 10 to the preferred path of travel. The side marginal regions of sub-belt 14 extend beyond the side marginal regions of photoconductive belt 12. Thus, only sub-belt 14 engages flanges 64 and photoconductive belt 12 is always spaced therefrom. Preferably, sub-belt 14 is substantially thicker than photoconductive belt 12. By way of example, sub-belt 14 ranges from about 5 to 7 mils in thickness. As shown in FIG. 2, sub-belt 14 includes a plurality of substantially equally spaced timing holes 66 in one side marginal region thereof. Timing holes 66 are utilized in conjuction with light source 68 and photosensor 70 to indicate the location of photoconductive belt 12 with respect to any processing station. In this way, the logic circuitry, which receives the electrical output signal from photosensor 70 actuates the appropriate processing station in response to photoconductive belt 12 moving to the desired location. By way of example, photosensor 70 may be a suitable photodiode and light source 68 a light emitting diode. In operation, light source 68 generates light rays which are transmitted to photosensor 70 only with a timing hole 66 being interposed therebetween. At all other times, belt 14 blocks the light rays or reduces the intensity thereof. Thus, when timing holes 66 are not interposed between light source 68 and photosensor 70, photosensor 70 either develops a low level signal or no signal. The logic circuitry includes a comparator which compares the output from photosensor 70 with a reference signal. Only when the reference signal is less than the output from photosensor 70 is a signal developed indicating the presence of the timing hole and defining the location of photoconductive belt 12 relative to the respective processing stations in the printing machine.

Figure 3:
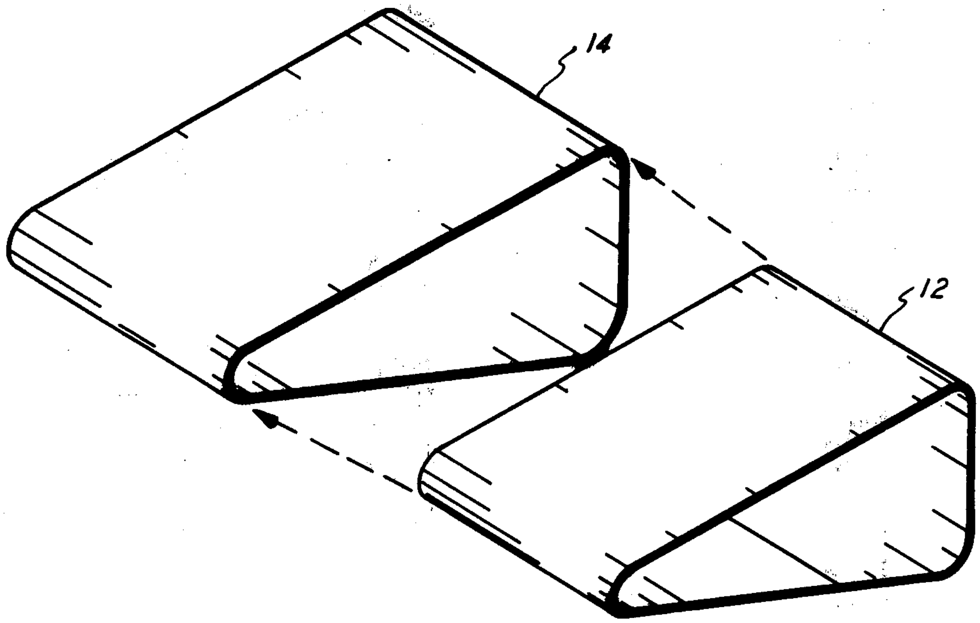
FIG. 3 is an exploded perspective view showing the size relationship between the sub-belt and photoconductive belt employed in the FIG. 1 printing machine.

Turning now to FIG. 3, there is shown the size relationship between photoconductive belt 12 and sub-belt 14. As depicted thereat, the circumferential path of photoconductive belt 12 is smaller than that of sub-belt 14. Thus, photoconductive belt 12 must be stretched when disposed on sub-belt 14. Preferably, photoconductive belt 12 is 0.05% smaller in circumference than sub-belt 14. When photoconductive belt 12 is positioned over sub-belt 14, it stretches approximately 0.05%. This produces a 1 pound per inch tension in a 0.03 mil thick photoconductive belt.

Figure 4:
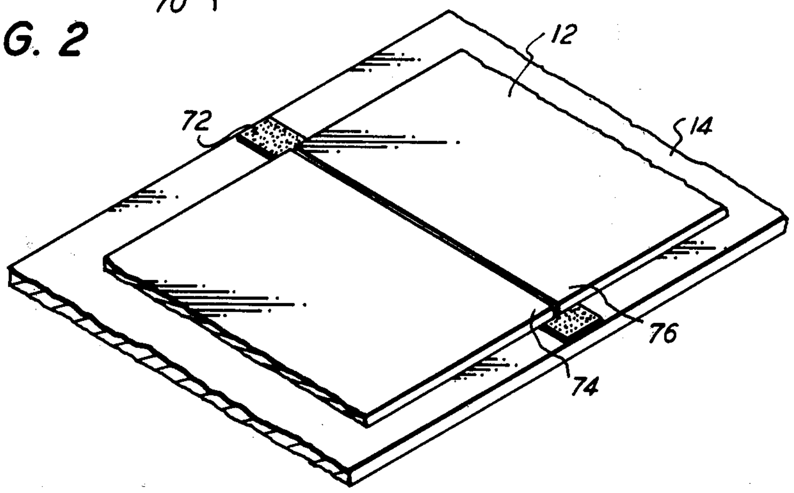
FIG. 4 is a fragmentary perspective view illustrating the manner in which the photoconductive belt is secured to the sub-belt.

Referring now to FIG. 4, there is shown one technique for securing photoconductive belt 12 to sub-belt 14. As depicted thereat a double sided adhesive strip 72 is secured to sub-belt 14. Leading marginal region 74 and trailing marginal region 76 of sub-belt 12 are pressed into contact with the sticky surface of adhesive strip 72. Inasmuch as photoconductive belt 12 has a circumference smaller than that of sub-belt 14, photoconductive belt 12 must be stretched in order to have both the leading and trailing marginal regions thereof closely adjacent to one another when secured to adhesive strip 72. Alternative techniques may be employed for securing photoconductive belt 12 to sub-belt 14. For example, strip 72 may have one surface thereof cemented to one surface of sub-belt 14 with the other surface thereof being made from a Velcro-like material. Both leading and trailing marginal regions 74 and 76 of photoconductive belt 12 may have meshing Velcro material thereon. In this way, the Velcro material on leading and trailing edges 74 and 76 of belt 12 meshes with the Velcro material on adhesive strip 72 and secure belt 12 to sub-belt 14. Other techniques would include mechanically gripping or electrostatically tacking photoconductive belt 12 to sub-belt 14.

In recapitulation, it is evident that the belt assembly of the present invention includes a relatively thick sub-belt which permits side edge steering with a photoconductive belt being secured releasably thereto. In this way, permanent timing marks may be fabricated in the sub-belt without requiring the fabrication of such marks on every photoconductive belt. The relative thickness of the sub-belt with respect to the photoconductive belt produces a stronger belt assembly which is not readily damageable and provides a long useful belt life.

It is, therefore, evident that that there has been provided in accordance with the present invention, a belt assembly for use in an electrophotographic printing machine that fully satisfies the objects, aims, and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A belt assembly, including:

a sub-belt;

a photoconductive belt arranged to be secured releasably to one surface of said sub-belt;

a strip having one surface thereof attached to said sub-belt with the other surface thereof having an adhesive so as to enable the leading and trailing edges of said photoconductive belt to be attached thereto; and means for supporting movably said sub-belt, said supporting means defining a path about which said sub-belt moves in unison with said photoconductive belt.

2. An assembly as recited in claim 1, wherein opposed side marginal regions of said sub-belt extend beyond opposed side marginal regions of said photoconductive belt.

3. An assembly as recited in claims 2 or 1, wherein the leading and trailing edges of said sub-belt are attached to one another defining a first closed path and the leading and trailing edges of said photoconductive belt are attached to one another defining a second closed path with the second path defined by said photoconductive belt being smaller than the first path defined by said sub-belt so as to stretch said photoconductive belt producing forces securing said photoconductive belt to said sub-belt.

4. An assembly as recited in claim 1, wherein said supporting means includes:

a plurality of spaced posts having said sub-belt entrained about the outer peripheries thereof; and a pair of opposed, spaced edge guides secured to one of said posts and arranged to contact the side edge of said sub-belt when said sub-belt deviates laterally from the preferred path of movement thereof so as to restore said sub-belt to the preferred path.

5. An electrophotographic printing machine of the type having a photoconductive belt assembly moving about a preferred path through a plurality of processing stations, wherein the improvement includes:

a sub-belt;

a photoconductive belt arranged to be secured releasably to one surface of said sub-belt;

a strip having one surface thereof attached to said sub-belt with the other surface thereof having an adhesive so as to enable the leading and trailing edges of said photoconductive belt to be attached thereto; and means for supporting movably said sub-belt, said supporting means defining a path about which said sub-belt moves in unison with said photoconductive belt.

6. A printing machine as recited in claim 5, wherein opposed side marginal regions of said sub-belt extend beyond the opposed side marginal regions of said photoconductive belt.

7. A printing machine as recited in claims 4 or 5, wherein the leading and trailing edges of said sub-belt are attached to one another defining a first closed path and the leading and trailing edges of said photoconductive belt are attached to one another defining a second closed path with the second closed path being smaller than the first closed path so as to stretch photoconductive belt producing forces securing said photoconductive belt to said sub-belt.

8. A printing machine as recited in claim 5, wherein said supporting means includes:

a plurality of spaced posts having said sub-belt entrained about the outer peripheries thereof; and a pair of opposed, spaced edge guides secured to one of said posts and arranged to contact a side edge of said sub-belt when said sub-belt deviates laterally from the preferred path to restore said sub-belt to the preferred path.

* * * * *